US006995773B2

United States Patent
Doyle et al.

(10) Patent No.: US 6,995,773 B2
(45) Date of Patent: *Feb. 7, 2006

(54) AUTOMATIC MEMORY MANAGEMENT

(75) Inventors: Peter L. Doyle, El Dorado Hills, CA (US); Aditya Sreenivas, El Dorado Hills, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/861,589

(22) Filed: Jun. 3, 2004

(65) Prior Publication Data

US 2004/0222998 A1 Nov. 11, 2004

Related U.S. Application Data

(63) Continuation of application No. 10/038,921, filed on Dec. 31, 2001, now Pat. No. 6,747,658.

(51) Int. Cl.
*G09G 5/36* (2006.01)

(52) U.S. Cl. .................... 345/559; 345/501; 345/543
(58) Field of Classification Search .............. 345/501, 345/502, 530, 531, 559, 564, 541, 543, 418; 711/147, 153, 170–173
See application file for complete search history.

(56) References Cited

U.S. PATENT DOCUMENTS

| 6,046,752 | A | 4/2000 | Kirkland et al. |
|---|---|---|---|
| 6,344,852 | B1 | 2/2002 | Zhu et al. |
| 6,380,935 | B1 | 4/2002 | Heeschen et al. |
| 6,396,473 | B1 | 5/2002 | Callahan et al. |
| 2003/0122836 | A1 | 7/2003 | Doyle |

FOREIGN PATENT DOCUMENTS

WO     WO 01/37220 A1     5/2001

OTHER PUBLICATIONS

PCT International Search Report, dated Aug. 26, 2003 (International Application No. PCT/US02/39791—International Filing Date Nov. 12, 2002) (6 pgs).

*Primary Examiner*—Kee M. Tung
(74) *Attorney, Agent, or Firm*—Sharon Wong

(57) ABSTRACT

The present invention optimizes graphics performance during zone rendering by providing an automatic management of bin memory between the binning and rendering phases. Embodiments of the present invention provide a mechanism by which the binner and renderer automatically share a pool of physical memory pages in order to build bin buffers and recycle them after they have been used in rendering. This is performed in such a fashion that multiple binned scenes can be queued up concurrently, with no requirement for software intervention except under exceptional conditions. The need for software management of zone rendering bin buffer memory is thus eliminated. Multiple scenes for binning and rendering can also be queued without software intervention.

15 Claims, 6 Drawing Sheets

AUTOMATIC MEMORY MANAGEMENT

This application is a continuation of Ser. No. 10/038,921, filed on Dec. 31, 2001, now U.S. Pat. No. 6,747,658, entitled "Automatic Memory Management for Zone Rendering."

BACKGROUND

1. Field

The present invention relates generally to graphics systems and more particularly to graphics rendering systems.

2. Background Information

Computer graphics systems are commonly used for displaying graphical representations of objects on a two-dimensional video display screen. Current computer graphics systems provide highly detailed representations and are used in a variety of applications. In typical computer graphics systems, an object to be represented on the display screen is broken down into graphics primitives. Primitives are basic components of a graphics display and may include points, lines, vectors and polygons, such as triangles and quadrilaterals. Typically, a hardware/software scheme is implemented to render or draw the graphics primitives that represent a view of one or more objects being represented on the display screen.

The primitives of the three-dimensional objects to be rendered are defined by a host computer in terms of primitive data. For example, when the primitive is a triangle, the host computer may define the primitive in terms of X, Y and Z coordinates of its vertices, as well as the red, green and blue (R, G and B) color values of each vertex. Additional primitive data may be used in specific applications.

Image rendering is the conversion of a high-level object-based description into a graphical image for display on some display device. For example, an act of image rendering occurs during the conversion of a mathematical model of a three-dimensional object or scene into a bitmap image. Another example of image rendering is converting an HTML document into an image for display on a computer monitor. Typically, a hardware device referred to as a graphics-rendering engine performs these graphics processing tasks. Graphics-rendering engines typically render scenes into a buffer that is subsequently output to the graphical output device, but it is possible for some rendering-engines to write their two-dimensional output directly to the output device. The graphics-rendering engine interpolates the primitive data to compute the display screen pixels that represent the each primitive, and the R, G and B color values of each pixel.

A graphics-rendering system (or subsystem), as used herein, refers to all of the levels of processing between an application program and a graphical output device. A graphics engine can provide for one or more modes of rendering, including zone rendering. Zone rendering attempts to increase overall 3D rendering performance by gaining optimal render cache utilization, thereby reducing pixel color and depth memory read/write bottlenecks. In zone rendering, a screen is subdivided into an array of zones and per-zone instruction bins, used to hold all of the primitive and state setting instructions required to render each sub-image, are generated. Whenever a primitive intersects (or possibly intersects) a zone, that primitive instruction is placed in the bin for that zone. Some primitives will intersect more than one zone, in which case the primitive instruction is replicated in the corresponding bins. This process is continued until the entire scene is sorted into the bins. Following the first pass of building a bin for each zone intersected by a primitive, a second zone-by-zone rendering pass is performed. In particular, the bins for all the zones are rendered to generate the final image.

Conventional zone rendering systems are inefficient in that they require extensive software intervention and/or management for numerous functions, including but not limited to, bin memory functions and queuing of multiple scenes for binning and rendering.

What is needed therefore is a method, apparatus and system for automatic management of bin memory between the binning and rendering phases.

DETAILED DESCRIPTION

Figure 1:
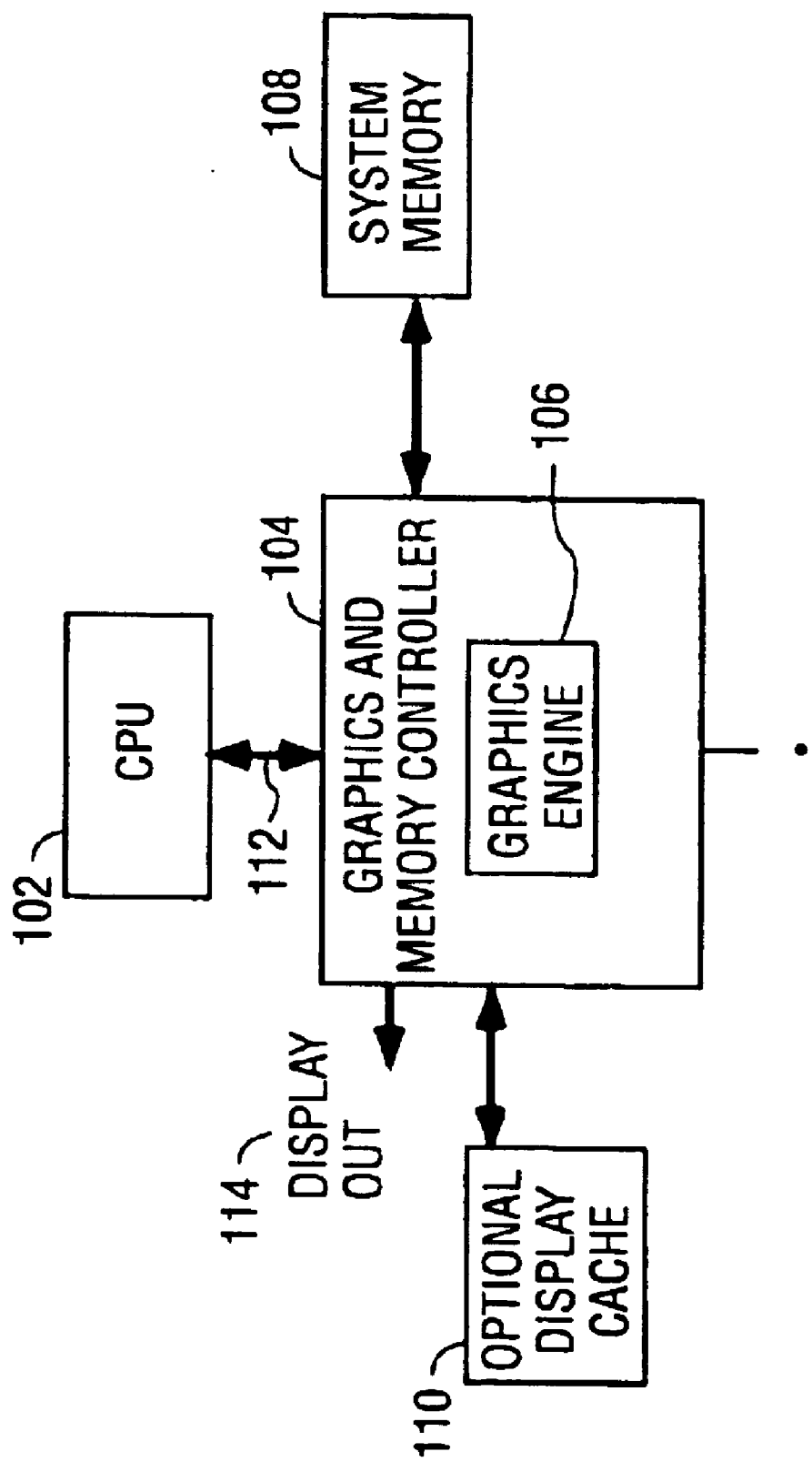
FIG. 1 illustrates a block diagram of an embodiment of a computer system including an embodiment of a graphics device for automatic memory management for zone rendering.

The present invention optimizes graphics performance during tile based rendering such as zone rendering by providing an automatic management of bin memory between the binning and rendering phases. Embodiments of the present invention provide a mechanism by which the binner and renderer automatically share a pool of physical memory pages in order to build bin buffers and recycle them after they have been used in rendering. This is performed in such a fashion that multiple binned scenes can be queued up concurrently, with no requirement for software intervention except under exceptional conditions. The need for software management of zone rendering bin buffer memory is thus substantially minimized. These characteristics enhance system performance.

In the detailed description, numerous specific details are set forth in order to provide a thorough understanding of the present invention. However, it will be understood by those skilled in the art that the present invention maybe practiced without these specific details. In other instances, well-known methods, procedures, components and circuits have been described in detail so as not to obscure the present invention.

Some portions of the detailed description that follow are presented in terms of algorithms and symbolic representations of operations on data bits or binary signals within a computer. These algorithmic descriptions and representations are the means used by those skilled in the data processing arts to convey the substance of their work to others skilled in the art. An algorithm is here, and generally, considered to be a self-consistent sequence of steps leading to a desired result. The steps include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise as apparent from the following discussions, it is appreciated that throughout the specification, discussions utilizing such terms as "processing" or "computing" or "calculating" or "determining" or the like, refer to the action and processes of a computer or computing system, or similar electronic computing device, that manipulate and transform data represented as physical (electronic) quantities within the computing system's registers and/or memories into other data similarly represented as physical quantities within the computing system's memories, registers or other such information storage, transmission or display devices.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

An example of one such type of processing system is shown in FIG. 1. Sample system 100 may be used, for example, to execute the processing for methods in accordance with the present invention, such as the embodiment described herein. Sample system 100 is representative of processing systems based on the microprocessors available from Intel Corporation, although other systems (including personal computers (PCs) having other microprocessors, engineering workstations, set-top boxes and the like) may also be used. In one embodiment, sample system 100 may be executing a version of the WINDOWS.TM. operating system available from Microsoft Corporation, although other operating systems and graphical user interfaces, for example, may also be used.

FIG. 1 is a block diagram of a system 100 of one embodiment of the present invention. The computer system 100 includes central processor 102, graphics and memory controller 104 including graphics device 106, memory 108 and display device 114. Processor 102 processes data signals and may be a complex instruction set computer (CISC) microprocessor, a reduced instruction set computing (RISC) microprocessor, a very long instruction word (VLIW) microprocessor, a process implementing a combination of instruction sets, or other processor device, such as a digital signal processor, for example. Processor 102 may be coupled to common bus 112 that transmits data signals between processor 102 and other components in the system 100. FIG. 1 is for illustrative purposes only. The present invention can also be utilized in a configuration including a descrete graphics device.

Processor 102 issues signals over common bus 112 for communicating with memory 108 or graphics and memory controller 104 in order to manipulate data as described herein. Processor 102 issues such signals in response to software instructions that it obtains from memory 108. Memory 108 may be a dynamic random access memory (DRAM) device, a static random access memory (SRAM) device, or other memory device. Memory 108 may store instructions and/or data represented by data signals that may be executed by processor 102, graphics device 106 or some other device. The instructions and/or data may comprise code for performing any and/or all of the techniques of the present invention. Memory 108 may also contain software and/or data. An optional cache memory 110 may be used to speed up memory accesses by the graphics device 106 by taking advantage of its locality of access.

In some embodiments, graphics device 106 can offload from processor 102 many of the memory-intensive tasks required for rendering an image. Graphics device 106 processes data signals and may be a complex instruction set computer (CISC) microprocessor, a reduced instruction set computing (RISC) microprocessor, a very long instruction word (VLIW) microprocessor, a process implementing a combination of instruction sets, or other processor device, such as a digital signal processor, for example. Graphics device 106 may be coupled to common bus 112 that transmits data signals between graphics device 106 and other components in the system 100, including render cache 110 and display device 114. Graphics device 106 includes rendering hardware that among other things writes specific attributes (e.g. colors) to specific pixels of display 114 and draw complicated primitives on display device 114. Graphics and memory controller 104 communicates with display device 114 for displaying images rendered or otherwise processed by a graphics controller 104 for displaying images rendered or otherwise processed to a user. Display device 114 may comprise a computer monitor, television set, flat panel display or other suitable display device.

Memory 108 stores a host operating system that may include one or more rendering programs to build the images of graphics primitives for display. System 100 includes graphics device 106, such as a graphics accelerator that uses customized hardware logic device or a co-processor to improve the performance of rendering at least some portion of the graphics primitives otherwise handled by host rendering programs. The host operating system program and its host graphics application program interface (API) control the graphics device 106 through a driver program.

Figure 2:
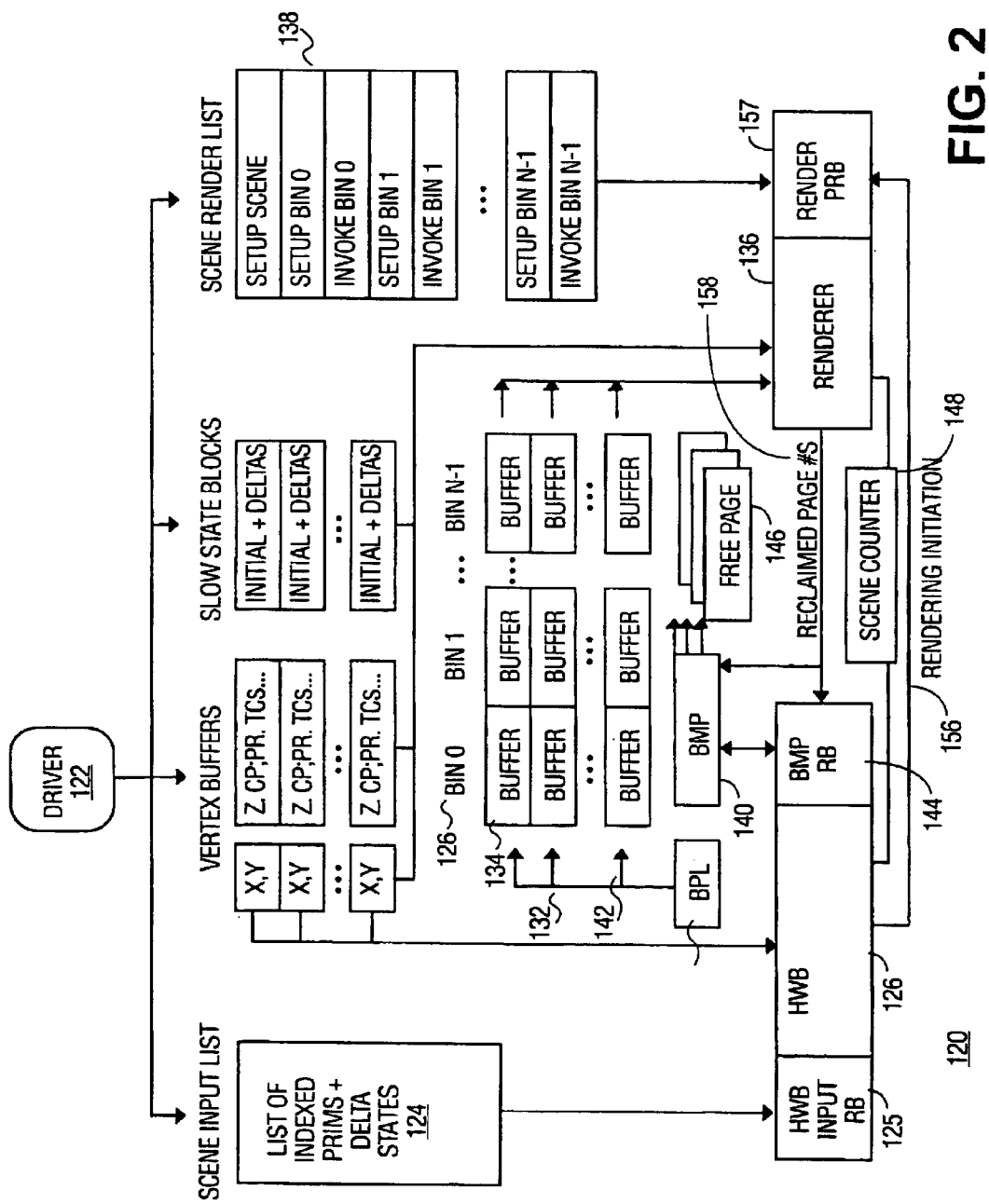
FIG. 2 illustrates a block diagram of an embodiment of a graphics device including a graphics-binning engine, graphics-rendering engine, bins, bin memory pool, bin pointer list and scene counter.
Figure 3:
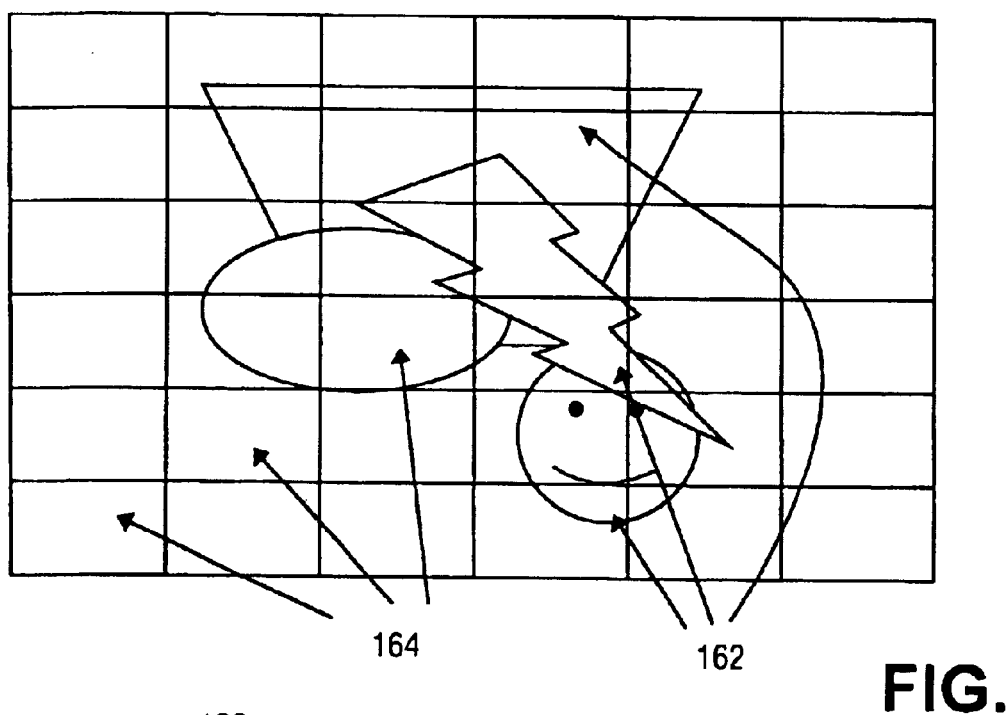
FIG. 3 illustrates a depiction of an embodiment of a zone renderer screen view including zones and geometrical primitives.

Referring to FIGS. 2 and 3, an embodiment 160 of various graphics objects, for example geometric primitives (i.e. triangles, lines) 162, implemented on a zone rendering system 120 is illustrated. In zone rendering, a screen is subdivided into an array of zones 164 commonly screen-space rectangles although other geometric variants may be used as well. Each zone 164 is associated with a bin. Each bin 128 includes a chained series of command buffers 134 stored within non-contiguous physical memory pages. The bins 128 are thus preferably implemented as a chain of independent physical pages.

When a primitive 162 intersects a zone 164, the corresponding primitive instruction is placed in the bin 128 associated with the zone 164 intersected. Per-zone instruction bins 128 are thus used to hold primitive instructions and state setting instructions required to render each sub-image and are generated by comparing the screen-space extent of each primitive 162 to the array of zones 164. Thus, as the primitives 162 are received, the present invention determines which zone(s) 164 each primitive 162 intersects, and replicates the primitive instructions into a bin 128 associated with each of these zones 164. The process of assigning primitives (and their attributes) 142 to zones 164 is referred to as binning. "Bin" 128 refers to the abstract buffer used for each zone—where a bin 128 will typically be realized as a series of instruction batch buffers 134. Binning performs the necessary computations to determine what primitives 162 lie in what zones 164 and can be performed by dedicated hardware and/or software implementations. In one typical implementation, a driver 122 writes out a set of commands to be parsed by the graphics-binning engine 126 for each zone 164 intersected by a primitive 162 and the commands are written into buffers 134 associated with the zones 164 intersected.

Some primitives 162 will intersect more than one zone 164, in which case the primitive instruction is replicated in bins 128 corresponding to the intersected zones 164. For example, the lightening bolt depicted in FIG. 3 intersects nine zones 164. This process is continued until the entire scene is sorted into bins 128.

Once all the primitives 162 are sorted and the command structures completed, a second pass is made to render the scene one zone 164 at a time. Following the first pass of building a bin for each zone 164 intersected by a primitive 162, a second zone-by-zone rendering pass is performed. In particular, the bins 128 for all the zones 164 are rendered to generate the final image, with each scene rendered one zone 164 at a time. The order with which the zones 164 are rendered is not significant. All bins 128 associated with primitives 162 that touch pixels within a particular zone 164 are rendered before the next zone 164 is rendered. A single primitive 162 may intersect many zones 164, thus requiring multiple replications. As a result, primitives 162 that intersect multiple zones 164 are rendered multiple times (i.e. once for each zone 164 intersected).

Rendering performance improves as a result of the primitives 162 being decomposed into zones 164 that are aligned to the render cache 110. Since the graphics device 106 is only working on a small portion of the screen at a time (i.e. a zone 164), it is able to hold the frame buffer contents for the entire zone 164 in a render cache 110. The dimensions of the zone 164 are typically a constant tuned to the size and organization of the render cache 110. It is by this mechanism that the render cache 110 provides optimal benefits—reuse of cached data is maximized by exploiting the spatial coherence of a zone 164. Through use of the zone rendering mode, only the minimum number of color memory writes need be performed to generate the final image one zone 164 at a time, and color memory reads and depth memory reads and writes can be minimized or avoided altogether. Use of the render cache 110 thus significantly reduces the memory traffic and improves performance relative to a conventional renderer that draws each primitive completely before continuing to the next primitive.

Referring to FIG. 2, in a typical implementation, a graphics primitive and state-setting instruction stream, referred to as a scene input list 124, is initially applied to graphics-binning engine ring buffer 125 associated with graphics-binning engine 126. The scene input list 124 may be a single, temporally-ordered scene description (as received by the application programming interface). Graphics-binning engine 126 is typically implemented as a hardware binning engine (HWB) 126. One skilled in the art will recognize that a software or software plus hardware binner could be used as well. The graphics-binning engine 126 parses scene input list 124 and determines which zone(s) 164 each primitive 162 intersects.

Figure 5:
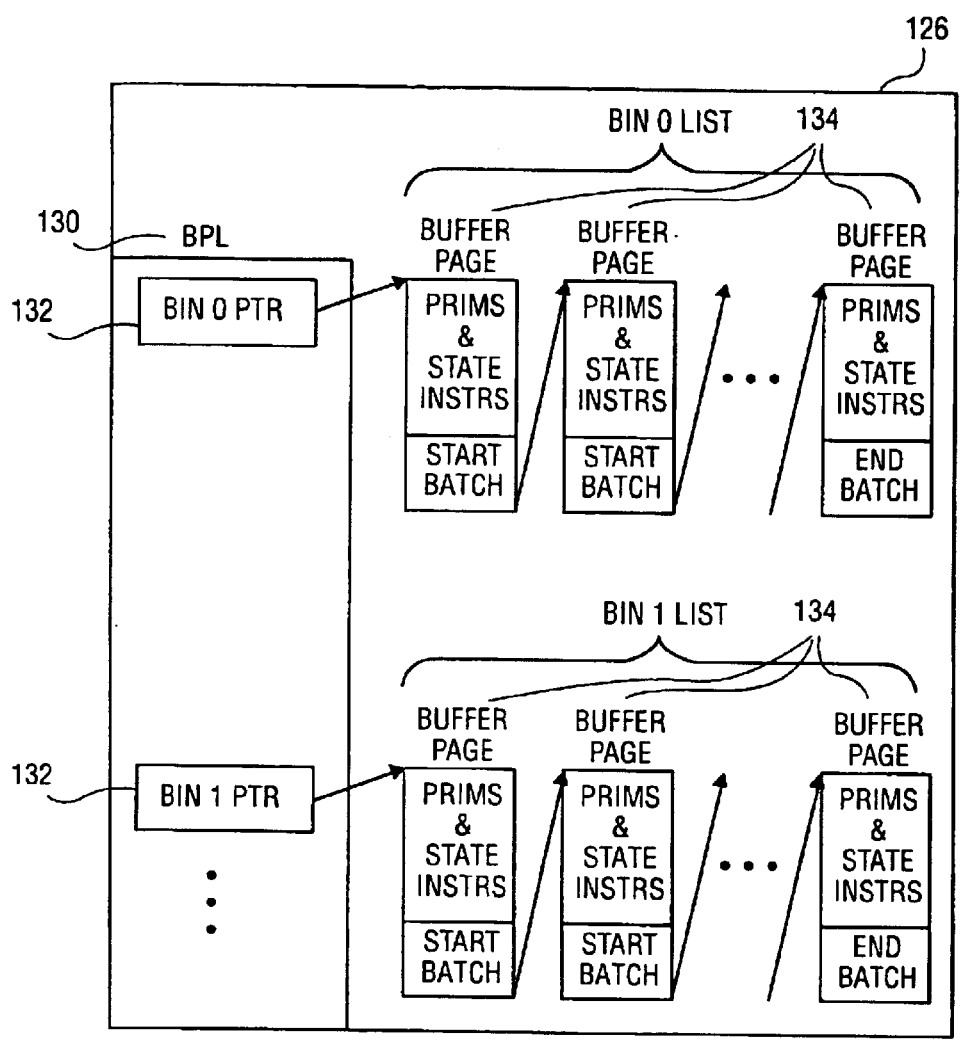
FIG. 5 illustrates a detailed block diagram of an embodiment of a bin pointer list and associated bins.

As previously noted, the zones 164 are associated with bins 128. Graphics-binning engine 126 compares the screen-space extent of each primitive 162 to the array of zones 164, and replicates the associated primitive commands into corresponding bins 128. As shown in FIG. 5 and described in detail below, bins 128 are comprised of chained series of command buffers 134 typically stored within non-contiguous physical memory pages. A bin list is a list of buffers 134 which comprise each bin 132. Pages are initially allocated to the BMP 140. The bin pointer list 130 is initialized with the page numbers of the pages and stores a write pointer into the bin list 132.

The graphics-binning engine 126 also maintains the current graphics state by parsing associated state-setting instructions contained with the scene input list 124. Prior to placing a primitive command in any given bin 128, the graphics-binning engine 126 typically precedes the primitive command in the bin 128 with any required state-setting instructions.

After the scene input list 124 has been completely parsed, the collection of associated bins (i.e. bin 0, bin 1 . . . bin n-1) are ready to be used by the graphics-rendering engine 136 to render the scene. As discussed in detail below, instructions are included at the end of the scene input list 124 to cause the graphics-binning engine 126 to increment the register in pending scene counter 148 by one and initiate rendering of the binned scene. For example, graphics-binning engine 126 sends a render instruction to graphics-rendering engine ring buffer 157 associated with graphics-rendering engine 136 via path 156.

Figure 4:
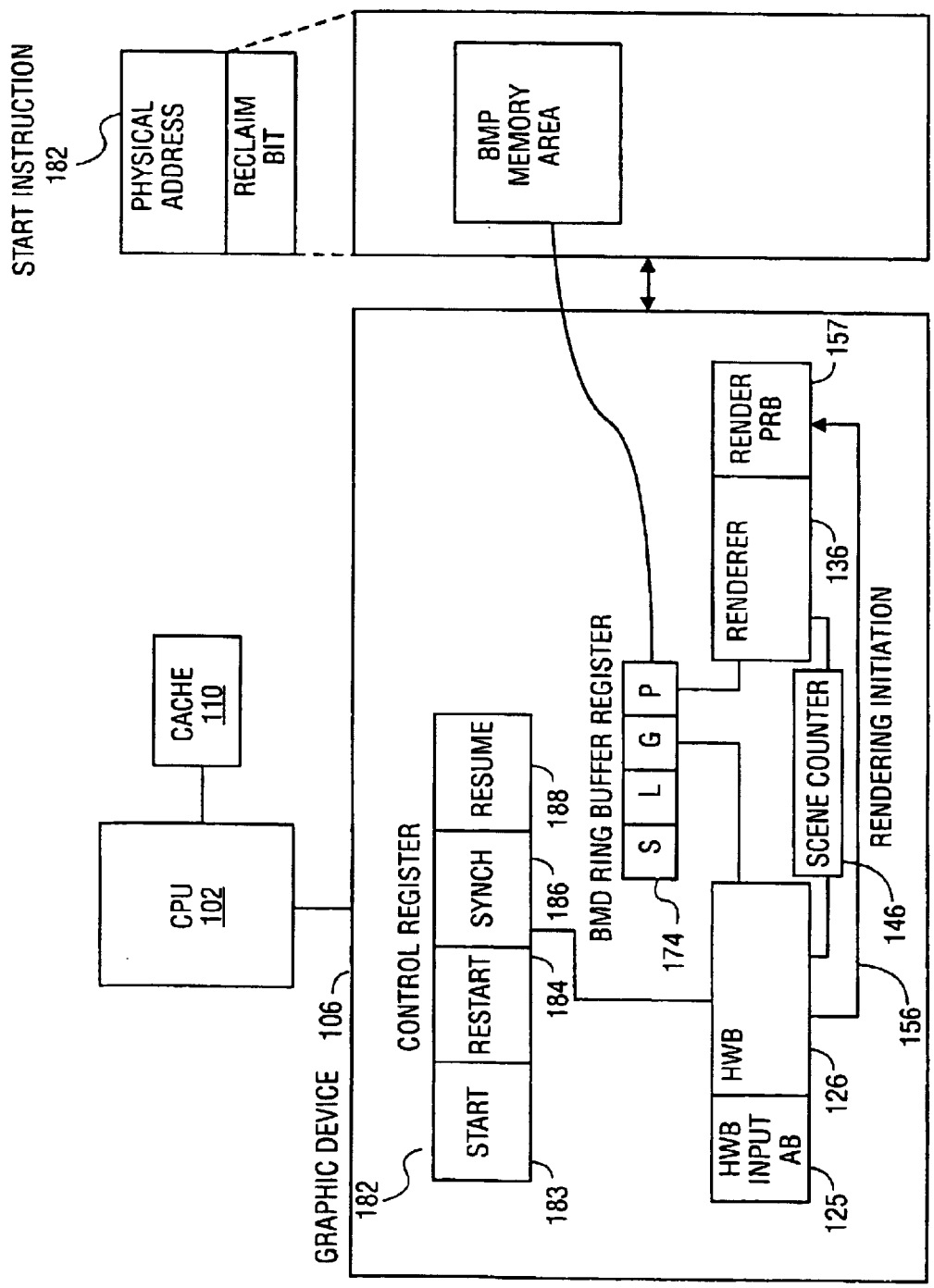
FIG. 4 illustrates a detailed block diagram of an embodiment of a bin memory pool memory area and a graphics device including a graphics-binning engine, graphics-rendering engine, bin memory pool ring buffer register, control register and pending scene counter.

FIG. 4 illustrates a detailed block diagram of an embodiment of a bin memory pool memory area 180 and a graphics device including a graphics-binning engine 126, graphics-rendering engine 136, BMP ring buffer register 174, control register 182 and pending scene counter 148. BMP ring buffer memory area 180 holds a list of pointers to free physical pages available for use by binner 125. After the initial buffers for each bin 128 are set up, the scene generating instruction stream are generated.

Referring to FIG. 5, an embodiment 170 of a bin pointer list (BPL) 130, including current bin pointers 132 and bins 128, is illustrated. The bin pointer list 130, maintained in memory, is used to store the initial and, subsequent, current pointer 132 into the bin pointer list 130 for each bin 128. BMP ring buffer memory area 180 holds a list of pointers to free physical pages available for use by binner 125. In particular, the bin pointer list 130 is a physically contiguous, size-aligned array of bin pointers 132, where the size of the bin pointer list 130 is equal or approximately equal to the maximum number of bins 128 supported by the graphics device 106. Each bin pointer 142 contains the current bin write pointer (e.g., a physical Word address) for a bin 128, along with a bin state value. In a typical embodiment, bin pointers 132 are stored in a tiled fashion, where every 8 Dwords (256-bit cache line) contains a re-arranged list of bin pointers 142 for a 1-wide by 4-high rectangular group of bins 128.

Figure 6:
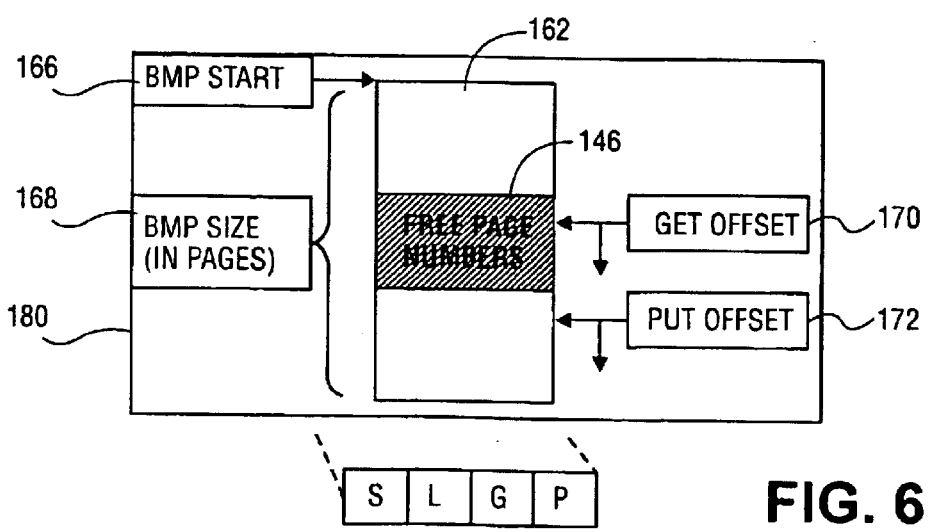
FIG. 6 illustrates a block diagram of an embodiment of a bin memory pool ring buffer memory area and associated bin memory pool ring buffer register.

Referring to FIG. 6, an embodiment of a BMP ring buffer memory area 180 is illustrated. BMP ring buffer memory area 180 associated with BMP 140 holds a list of pointers to free physical pages available for use by the graphics-binning engine 126. The ring buffer memory area 180 maybe located in either the system memory 108 or a dedicated memory. Page numbers of available free pages 146 are generated and placed in BMP ring buffer 144. BMP ring buffer register 150 associated with BMP ring buffer memory area 180 may have multiple fields within the register. The fields contained within an embodiment of BMP ring buffer register 174 include, but are not limited to, a start address field (S) 166, buffer length field (L) 168, get offset field (G) 170, put offset field (P) 172 and other fields. The BMP ring buffer register 174 defines the start 166 and length 168 of the BMP ring buffer memory area 180, and includes two "offsets," a get 170 and put 172, into the BMP ring buffer memory area 180. The BMP 140 itself is stored in an aligned list of physically contiguous memory, typically 4 KB, defined by a starting physical page number and a size in pages, typically 4 KB.

The graphics device 106, including the graphics-binning engine 126 and graphics-rendering engine 136, access BMP ring buffer memory area 180 via get and put offset registers 170 and 172. The BMP 140 is initially initialized and specified by writing the BMP register which provides for the BMP start 166 and BMP size 168. The get offset 170 and put offset 172 are typically initialized, prior to any binner usage, to zero to indicate a complete complement of free pages.

Referring to FIG. 4, graphics device 106 also includes a bin control register 182 including multiple fields within the register. The fields contained within an embodiment of the bin control register 182 include, but are not limited to, a restart bit 184, synchronous end of scene bit 186, resume bit 188 and other fields. Once the BMP 140 is grown, binning of the scene is resumed via a direct write of the bin control register 182 to set a restart bit 184.

As a binned scene is rendered, the bin memory is allocated and then recycled for subsequent use in binning the next scene. In particular, each batch buffer 134 is initiated with a batch buffer start instruction 182 specifying a physical address and reclaim bit. The graphics-rendering engine 136 decodes and executes the batch buffer start instruction 182 when it renders each batch buffer 134. The graphics-rendering engine 136 will insert free pages 146 into BMP 140 at the end of processing a batch buffer 134 initiated with a batch buffer start instruction 182 specifying a physical address and having the "reclaim" bit set. This process allows bin buffer memory 134 (i.e. pages) to be automatically reclaimed without software intervention. The put offset 172 informs the graphics-rendering engine 136 of the put offset 172 at which to write the page number of the next freed-up buffer 134. The graphics-rendering engine 136 uses the put offset 172 to return the pages of bin buffers 134 to the BMP 140 as their execution completes.

The graphics-binning engine 126 and graphics-rendering engine 136 are in communication with the pending scene counter 148 which monitors and counts every scene being binned. The pending scene counter 148 is initialized to zero, and when non-zero, indicates the current processing of at least one binned scene. When there is no pending scene(s), the pending scene counter 148 is zero. The pending scene counter 148 is incremented each time a scene is being binned. Correspondingly, the pending scene counter 148 is decremented each time a binned scene is rendered. In particular, in order to initialize graphics state for the rendering of each bin 128, a special instruction is placed at the end of the scene render list 124 that will decrement the pending scene counter 148 by one. When the pending scene counter 148 decrements to one, there are no complete scenes queued up for rendering.

BMP ring buffer memory area 180 can hold one or more bin pointer lists 130, where each bin pointer lists 130 is a list of physical page numbers to be used for the initial bin buffer (one page number per zone). Multiple bin lists (typically two for a double buffer) allow binning of the next scene to start while the graphics-binning engine 126 is actively binning the current scene. In order to allow the binning of the next scene to be started before the current scene has completed binning, more than one bin pointer list 130 is used to provide a multi-buffered input to the binner 128. The Dword entries in the BMP ring buffer memory area 180 contain a physical page number and an associated memory space selection if the device supports multiple physical memory spaces.

Referring to FIGS. 4 and 5, in the process of creating a new bin buffer 134, graphics-binning engine 126 will extract a free page number 146 from BMP 140 assuming one is available. In particular, during binning of a scene, graphics-binning engine 126 queries the BMP ring buffer memory area 180 to determine if there is a free page available. The get offset 170 informs graphics-binning engine 126 of the offset of the page number of the next available free page 146 to retrieve. The graphics-binning engine 126 will use this offset to obtain the physical pages 146 required to build the bins 128. When the graphics-binning engine 126 attempts to extract a free page number 146 but finds the BMP 140 is empty, the graphics-binning engine 126 queries the pending scene counter 148 to determine whether there are any "pending" binned scenes. If the pending scene counter 148 is non-zero, the graphics-binning engine 126 remains idle until a free page 146 becomes available or the pending scene counter 148 becomes zero If the pending scene counter 148 is zero, there are no pending binned scenes and thus no potential source of freed-up pages. At that point, the BMP 140 is grown by increasing the BMP 140 by a size necessary to accommodate the required number of additional free page numbers 146. In a typical implementation, the BMP 140 is grown in multiples of 4KB. Additional free page numbers are then inserted into the larger BMP 140 and the BMP ring buffer registers 166, 168, 170 and 172 are accordingly adjusted. The new list of free pages 146 are placed at the top of the BMP ring buffer memory area 180 and the pointers adjusted. For example, both pointers can be moved as the graphics-binning engine 126 will simply resume using the new pointer values. The graphics-binning engine 126 then extracts a free page number 146 from the BMP 140 and continue the binning process.

If additional free memory cannot be made, graphics-rendering engine 136 renders the partially-binned scene to free up bin memory and then restarts binning the remainder of the scene. In a typical embodiment, a direct write of the bin control register 182 to set a synchronous end scene bit 186 is performed. This causes the graphics-binning engine 126 to (a) close all valid bins 128 by terminating them with an instruction to end the batch buffer, (b) flush out any internally cached data (e.g., cached bin pointers 132), and (c) modify the state-tracking information associated with the bins 128 such that, upon resumption of binning, all necessary state is inserted into a bin 128 prior to the first primitive 162 it receives. Any other actions required to render the partially binned scene are also taken. These actions include, but are not limited to, a direct write of a bin scene register 190 to cause the pending scene counter 148 to get incremented and actions to ensure that the depth write enable bit of the zone control register is cleared prior to rendering the partial scene (as the rendering of the continuation of the scene will require depth values to have been written to memory).

Binning of the scene is resumed through a direct write of the bin control register 182 to set a resume bit 188. As noted above, the synchronous end scene operation will have all bin bit vectors used to track changes to state groups, so each bin 128 will be refreshed with the current state prior to any new primitive output.

The graphics-rendering engine 136 will insert free page numbers 146 into BMP 140 at the end of processing a batch buffer initiated with a batch buffer start instruction 182 specifying a physical address and having the "reclaim" bit set. This process allows bin buffer memory (i.e. pages) to be automatically reclaimed without software intervention. As a binned scene is rendered, the bin memory is allocated and then recycled for subsequent use in binning the next scene. In particular, the put offset 172 informs the graphics-rendering engine 136 of the put offset 172 at which to write the page number of the next freed-up buffer. The graphics-rendering engine 136 uses the put offset 172 to return the pages of bin buffers 134 to the BMP 140 as their execution completes.

Figure 7:
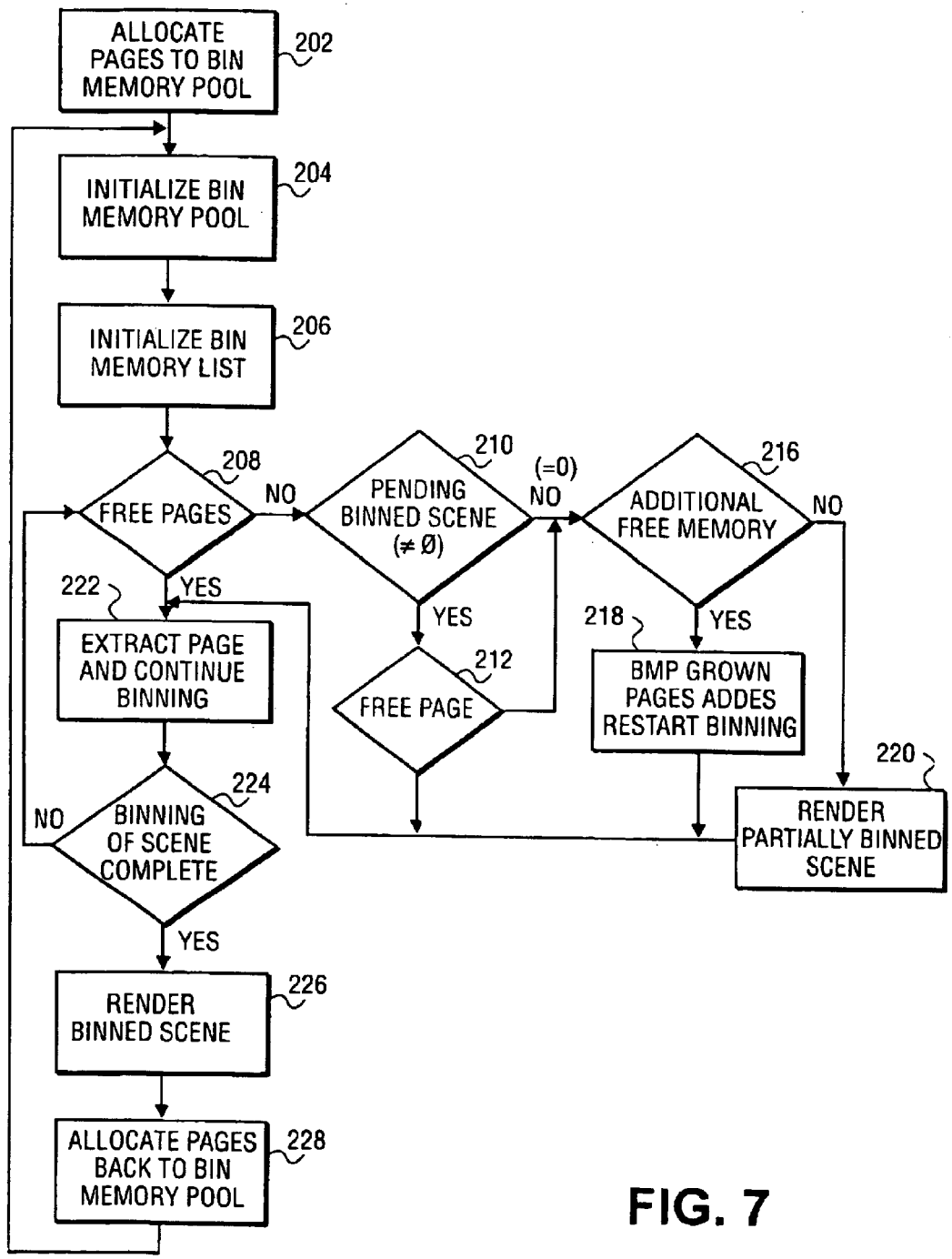
FIG. 7 illustrates a flow diagram of an embodiment of a process for automatic memory management.

FIG. 7 is a flow diagram illustrating an embodiment 200 for implementing automatic memory management, including automatic reclaiming of buffer memory.

Pages are initially allocated to the BMP 140 (step 202). The BMP 140 is then initialized (step 204). The BMP 140 is specified by writing the BMP buffer register which provides for the BMP start 166 and BMP size 168. The BMP's Get Offset 170 and Put Offset 172 are initialized, prior to any binner usage, to zero to indicate a complete complement of free pages.

The bin pointer list 130 is then initialized with the physical page numbers allocated (step 206). During binning of a scene, the present invention determines if there are free pages available (step 208). When the graphics-binning engine 126 attempts to extract a free page number 146 but finds the BMP 140 empty, it performs one of two actions. If there are any "pending" binned scenes (i.e. the pending scene counter 148 is non-zero) (step 210), the graphics-binning engine 126 will wait until a free page 146 becomes available or the pending scene counter 148 becomes zero (step 212).

In the event the graphics-binning engine 126 encounters an out of memory condition, and there are no pending binned scenes (and therefore no potential source of freed-up pages), an out of memory interrupt is generated. At that point, software has the option to provide more free pages by "growing" the BMP 140 (step 218). The BMP 140 is grown by initially increasing the BMP by a size necessary to accommodate the required number of additional free page numbers 146. Additional free page numbers are then inserted into the larger BMP 140 and the get and put offsets registers 166, 168, 170 and 172 are accordingly adjusted. If a free page 146 becomes available (step 212), the graphics-binning engine 126 will extract that page number 146 from the BMP 140 and continue the binning process.

If the pending scene counter 148 is zero (step 210) or becomes zero while waiting (step 212), the graphics-binning engine 126 will raise an out of memory exception which is capable of generating a processor interrupt (step 214).

At this point, if software can make additional free memory (step 216) available, the BMP 140 is grown, additional free pages 146 inserted and binning of the scene resumed via a direct write of the bin control register 182 to set a restart bit 184 (step 218).

If additional free memory (step 216) cannot be made the BMP 140 is considered in an "empty" state available, rendering of the partially-binned scene is forced in order to free up bin memory, then binning of the remainder of the scene is restarted (step 220). The graphics-binning engine 126 will then (a) close all valid bins by terminating them with an instruction to end the batch buffer, (b) flush out any internally cached data (e.g., cached bin pointers 132), and (c) modify the state-tracking information associated with the bins 128 such that, upon resumption of binning, all necessary state is inserted into a bin 128 prior to the first primitive 162 it receives. Any other actions required to render the partially binned scene are also taken. Binning of the scene is resumed through a direct write of the bin control register to set a resume bit. As noted above, the synchronous end scene operation will have all bin bit vectors used to track changes to state groups, so each bin 128 will be refreshed with the current state prior to any new primitive output.

Thus, in accordance with the present invention, the binner and renderer automatically share a pool of physical memory pages in order to build bin buffers during the binning phase and recycle them after than have been during the rendering phase. This is performed in such a fashion that multiple binned scenes can be queued up concurrently, with minimal software intervention.

Having now described the invention in accordance with the requirements of the patent statutes, those skilled in the art will understand how to make changes and modifications to the present invention to meet their specific requirements or conditions. Such changes and modifications may be made without departing from the scope and spirit of the invention as set forth in the following claims.

What is claimed is:

1. An apparatus, comprising:
    a binner;
    a renderer; and
    a first register and a second register, wherein the first register contains information to identify locations in memory where the binner can retrieve memory pages, and wherein the second register contains information to identify memory locations where the renderer can automatically return memory pages.

2. The apparatus of claim 1 wherein the binner uses the memory pages to configure buffers associated with zones.

3. The apparatus of claim 2 wherein the binner determines which zones a geometrical object intersects and replicates associated object instructions into the buffers associated with the intersected zones.

4. The apparatus of claim 1 wherein the binner, responsive to the first register, extracts available memory pages to configure bins associated with zones.

5. An apparatus, comprising:

a binner;

a renderer; and a memory area to store memory pages; and a first register and a second register, wherein the first register contains information to identify locations in the memory area where the binner can retrieve memory pages, and wherein the second register contains information to identify memory locations in the memory area where the renderer can automatically return memory pages.

6. The apparatus of claim 5 wherein the memory area comprises the system memory.

7. The apparatus of claim 5, further comprising:

determining areas a geometrical object intersects; and replicating associated object instructions into the buffers.

8. An article comprising: a storage medium having a plurality of machine readable instructions, wherein when the instructions are executed by a processor, the instructions provide for: identifying locations in memory where memory pages are retrieved, configuring buffers using the memory pages and identifying memory locations in memory where memory pages are automatically returned.

9. An article comprising a machine-readable medium that contains instructions, which when executed by a processing platform, cause said processing platform to perform operations comprising:

identifying locations in memory where memory pages are retrieved;

configuring buffers using the memory pages; and identifying memory locations in memory where memory pages are automatically returned.

10. The article of claim 9 wherein the memory area comprises system memory.

11. The article of claim 1 further comprising instructions, which when executed by a processing platform, cause said processing platform to perform operations comprising:

determining areas a geometrical object intersects; and replicating associated object instructions into the buffers.

12. An apparatus, comprising:

a device to determine which of the areas of a screen each polygon encompasses;

a renderer; and a first register and a second register, wherein the first register contains information to identify locations in memory where the device can retrieve memory pages, and wherein the second register contains information to identify memory locations where the renderer can automatically return memory pages.

13. The apparatus of claim 12 wherein the device uses the memory pages to configure buffers associated with the areas of the screen.

14. The apparatus of claim 12 wherein the device determines which of the areas of the screen a geometrical object intersects and replicates associated object instructions into buffers associated with the intersected areas of the screen.

15. The apparatus of claim 12 wherein the device, responsive to the first register, extracts available memory pages to configure bins associated with the areas of the screen.

* * * * *

UNITED STATES PATENT AND TRADEMARK OFFICE
CERTIFICATE OF CORRECTION

PATENT NO. : 6,995,773 B2  
APPLICATION NO. : 10/861589  
DATED : February 7, 2006  
INVENTOR(S) : Doyle et al.

Page 1 of 1

It is certified that error appears in the above-identified patent and that said Letters Patent is hereby corrected as shown below:

In column 12, at line 6, delete "1" and insert --9--.

Signed and Sealed this

Third Day of June, 2008

JON W. DUDAS  
*Director of the United States Patent and Trademark Office*